United States Patent
Okubo et al.

(10) Patent No.: US 11,253,910 B2
(45) Date of Patent: Feb. 22, 2022

(54) METHOD FOR PRODUCING FORGED CRANKSHAFT

(71) Applicant: NIPPON STEEL CORPORATION, Tokyo (JP)

(72) Inventors: Junichi Okubo, Tokyo (JP); Kenji Tamura, Tokyo (JP); Kunihiro Yoshida, Tokyo (JP); Sam Soo Hwang, Tokyo (JP); Ryusuke Nakano, Tokyo (JP); Masao Hori, Tokyo (JP); Yukihiro Ota, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 49 days.

(21) Appl. No.: 16/640,131

(22) PCT Filed: Jul. 30, 2018

(86) PCT No.: PCT/JP2018/028443
§ 371 (c)(1),
(2) Date: Feb. 19, 2020

(87) PCT Pub. No.: WO2019/039199
PCT Pub. Date: Feb. 28, 2019

(65) Prior Publication Data
US 2021/0187591 A1   Jun. 24, 2021

(30) Foreign Application Priority Data

Aug. 21, 2017  (JP) .............................. JP2017-158535

(51) Int. Cl.
*B21K 1/08*   (2006.01)
*B21J 5/02*   (2006.01)

(52) U.S. Cl.
CPC .................. *B21K 1/08* (2013.01); *B21J 5/025* (2013.01)

(58) Field of Classification Search
CPC ..... B21K 1/08; B21J 5/025; B21J 5/02; B21J 5/12; F16C 220/46; F16C 3/08
See application file for complete search history.

(56) References Cited

U.S. PATENT DOCUMENTS

2018/0071814 A1* 3/2018 Okubo .................... B21K 1/08

FOREIGN PATENT DOCUMENTS

| JP | 59045051 A | 3/1984 |
| JP | 62244545 A | 10/1987 |

(Continued)

OTHER PUBLICATIONS

ISR issued in Int'l. patent application No. PCT/JP2018/028443, dated Oct. 23, 2018.

*Primary Examiner* — Christopher J Besler
*Assistant Examiner* — Christine Bersabal
(74) *Attorney, Agent, or Firm* — Greer Burns & Crain Ltd.

(57) ABSTRACT

Provided is a production method, including a first preforming process for obtaining a first preform from a billet, a second preforming process for obtaining a final preform from the first preform, and a finish forging process for forming the final preform into a finishing dimension of a forged crankshaft. In the first preforming process, a plurality of flat parts are formed by pressing pin-corresponding parts and journal-corresponding parts in a direction perpendicular to an axial direction of the billet. The second preforming process includes: a process of pressing regions to be a plurality of journals with a width direction of the flat part as a pressing direction by using a pair of first dies; and a process of, after starting pressing by the first dies, decentering regions to be a plurality of pins with the width direction of the flat part as a decentering direction by using second dies.

4 Claims, 13 Drawing Sheets

(56) References Cited

FOREIGN PATENT DOCUMENTS

| | | | |
|---|---|---|---|
| JP | 02255240 | A | 10/1990 |
| JP | 2001105087 | A | 4/2001 |
| JP | 2016107273 | A | 6/2016 |
| WO | 2016147674 | A1 | 9/2016 |
| WO | 2016152933 | A1 | 9/2016 |

\* cited by examiner

IB-IB

VIIA-VIIA

VIIB-VIIB

XIVA-XIVA

XIVB-XIVB

METHOD FOR PRODUCING FORGED CRANKSHAFT

This is a National Phase application filed under 35 U.S.C. § 371, of International Application No. PCT/JP2018/028443, filed Jul. 30, 2018, the contents of which are incorporated by reference.

TECHNICAL FIELD

The present invention relates to a method for producing a crankshaft by hot forging.

BACKGROUND ART

A crankshaft is essential in a reciprocating engine for an automobile, a motorcycle, an agricultural machine, a ship or the like to transform reciprocating movement of a piston into rotational movement for deriving power. A crankshaft can be produced either by die forging or casting. When high strength and high rigidity are required for a crankshaft, a crankshaft produced by die forging (hereinafter referred to as a "forged crankshaft") is often used.

FIGS. 1A and 1B are each a schematic diagram to show an exemplaty general shape of a common forged crankshaft. Among these figures, FIG. 1A is a general view, and FIG. 1B is an 1B-1B sectional view of FIG. 1A. The example shown in FIG. 1B representatively shows one crank arm A7, a counterweight W7 that is integral with the crank arm A7, and a pin P4 and a journal J4, which are connected to the crank arm A7.

A forged crankshaft 11 shown in FIGS. 1A and 1B is a forged crankshaft of 4-cylinder 8-counterweight to be mounted on a 4-cylinder engine. The forged crankshaft 11 includes five journals J1 to J5, four pins P1 to P4, a front part Fr, a flange part F1, and eight crank arms (hereinafter also referred to as "arms") A1 to A8. The arms A1 to A8 connect the journals J1 to J5 with the pins P1 to P4, respectively. Moreover, the eight (all) arms A1 to A8 integrally include counterweights (hereinafter also referred to as "weights") W1 to W8. The front part Fr is provided at a front end in the axial direction of the forged crankshaft 11, and the flange part F1 is provided at a rear end thereof. The front part Fr is connected to the front most first journal J1, and the flange part F1 is connected to the rear most fifth journal J5.

Hereinafter, when collectively referring to the journals J1 to J5, the pins P1 to P4, the arms A1 to A8, and the weights W1 to W8, respectively, their symbols are also denoted as "J" in the journals. "P" in the pins, "A" in the arms, and "W" in the weights. Moreover, the arm A and the weight W that is integral with the arm A are collectively referred to as a "web".

As shown in FIG. 1B, a width Bw of the weight W is more than a width Ba of the arm A. Therefore, the weight W largely projects from an arm center plane (plane including center axes of the pin P and the journal).

When producing a forged crankshaft having such shape, in general, a billet is used as the starting material. A section perpendicular to the longitudinal direction of the billet, that is, a cross section thereof has circular or rectangular shape. The area of the cross section is constant over the entire length of the billet. The term "cross section" as used herein means a section perpendicular to the longitudinal direction of the billet or each preform to be described below, or the axial direction of the forged crankshaft. The term "longitudinal section" means a section in parallel with the longitudinal direction thereof or the axial direction thereof. Also, the area of a cross section is simply referred to as a "cross sectional area". The forged crankshaft is produced by performing a preforming process, a die forging process, and a flash-trimming process in that order. Moreover, as required, a coining process is performed after the flash-trimming process. Typically, the preforming process includes a roll forming process and a bend forging process. The die forging process includes a rough forging process and a finish forging process.

FIGS. 2A to 2F are schematic diagrams to illustrate a conventional production process of a typical forged crankshaft. Among these figures, FIG. 2A shows a billet; FIG. 2B a rolled preform; FIG. 2C a bent preform; FIG. 2D a rough forged preform; FIG. 2E a finish forged preform; and FIG. 2F a forged crankshaft. Note that FIGS. 2A to 2F show a series of processes when producing a forged crankshaft 11 having the shape shown in FIGS. 1A and 1B.

Referring to FIGS. 2A to 2F, the production method of the forged crankshaft 11 will be described. First, a billet 12 having a predetermined length as shown in FIG. 2A is heated in a heating furnace and thereafter subjected to roll forming and bend forging in that order in the preforming process, in the roll forming process, the billet 12 is rolled by use of, for example, a grooved roll, thereby reducing the cross sectional area. As a result, the volume of the billet 12 is distributed in the axial direction to obtain a rolled preform 13 that is an intermediate starting material (see FIG. 2B). Next, in the bend forging, the rolled preform 13 is partly pressed from a direction perpendicular to the axial direction. As a result, the volume of the rolled preform 13 is distributed to obtain a bent preform 14 that is a further intermediate starting material (see FIG. 2C).

Successively, in the rough forging process, the bent preform 14 is subjected to forging by use of a vertical pair of dies to obtain a rough forged preform 15 (see FIG. 2D). The resulting rough forged preform 15 has an approximate shape of the forged crankshaft (final product) formed thereon. Further, in the finish forging process, the rough forged preform 15 is subjected to forging by use of a vertical pair of dies, to obtain a finish forged preform 16 (see FIG. 2E). The resulting finish forged preform 16 has been formed into a shape corresponding to that of the forged crankshaft as the final product. During the rough forging and finish forging, excess material flows out from between die parting surfaces of mutually opposed dies, forming flash B. As a result, each of the rough forged preform 15 and the finish forged preform 16 has pronounced flash B around its circumference.

In the flash-trimming process, for example, the finish forged preform 16 having flash is held by being sandwiched between a pair of dies, and in that state, the flash B is punched off by use of a tool die. As a result, the flash B is removed from the finish forged preform 16, and thereby a flash-free forged preform is obtained. The flash-free forged preform has an approximately same shape as that of the forged crankshaft 11 as shown in FIG. 2F.

In the coining process, principal parts of the flash-free forged preform are pressed slightly from upward and downward with dies so that the flash-tree forged preform is reformed to have the same size and shape as those of the final product. Here, the principal parts of the flash-free forged preform include, for example, shaft portions such as the journals J, the pins P, the front part Fr, and the flange part F1, and further the arms A and the weights W. Thus, the forged crankshaft 11 is produced.

The production process shown in FIGS. 2A to 2F can be applied to various forged crankshafts without being limited to a forged crankshaft of 4-cylinder 8-counterweight as shown in FIGS. 1A and 1B. For example, it can be applied to a forged crankshaft of 4-cylinder 4-counterweight.

In the case of a forged crankshaft of 4-cylinder 4-counterweight, some of arms, out of the 8 (eight) arms A1 to A8, integrally include weights W, respectively. For example, the front most first arm A1, the rear most eighth arm A8, and two arms (the fourth arm A4 and fifth arm A5) in a middle part integrally include weights W, respectively. Moreover, remaining arms, specifically, the second, third, sixth, and seventh arms (A2, A3, A6, and A7) do not include any weight, and each have an elongated-circular shape.

Besides, the production process remains the same even for forged crankshafts to be mounted on a 3-cylinder engine, a series 6-cylinder engine, a V-type 6-cylinder engine, an 8-cylinder engine, and the like. Note that when adjustment of the layout angle of pin is required, a twisting process is added after a flash-trimming process.

The principal purpose of the preforming process is to distribute the volume of the billet. By distributing the volume of the billet in the preforming process, it is possible to reduce the formation of flash in the following die forging process, thereby improving material yield. Here, the term "material yield" means a fraction (percentage) of the volume of the forged crankshaft (final product) to that of the billet.

Moreover, a preform obtained by preforming is formed into a forged crankshaft in the following die forging process. To obtain a forged crankshaft with a precise shape, it is necessary to form a preform with a precise shape in the preforming process.

Techniques concerning production of a forged crankshaft are disclosed in Japanese Patent Application Publication No. 2001-105087 (Patent Literature 1), Japanese Patent Application Publication No. 02-255240 (Patent Literature 2), Japanese Patent Application Publication No. 62-244545 (Patent Literature 3), and Japanese Patent Application Publication No. 59-45051 (Patent Literature 4). Patent Literature 1 discloses a preforming method using a pair of upper and lower dies. In the preforming method, when a bar-like workpiece is pressed by the upper and lower dies, a part of the workpiece is elongated, and concurrently another part in continuous with that part is off set with respect to the axis. Patent Literature 1 states that since elongation and bending can be performed at the same time, it is possible to decrease the facility cost.

The preforming method of Patent Literature 2 uses a 4-pass high speed rolling facility instead of conventional 2-pass roll forming. In that preforming method, the cross sectional area of a rolled preform is determined according to the distribution of cross sectional areas of a weight, an arm, and a journal of a forged crankshaft (final product). Patent Literature 2 states that this allows improvement of material yield.

In the preforming method of Patent Literature 3, the volume of a part of a billet is distributed in an axial direction and a radial direction of the billet by cross rolling. By die forging the billet in which volume is distributed, a forged crankshaft is obtained. Patent Literature 3 states that as a result, material yield can be improved.

In the production method of Patent Literature 4, a billet is formed into a forged crankshaft by a single die forging step by use of a pair of upper and lower dies and a punch. In the die forging process, first, a region to be a journal and a region to be a pin of the billet are pressed by use of punches which operate independently. As a result of pressing, the volume of the billet is distributed. Thereafter, die forging is performed by means of the upper die and the lower die. That is, preforming and die forging can be performed in a single step. Patent Literature 4 states that as a result, the forged crankshaft with a complex shape can be efficiently produced by a single facility.

CITATION LIST

Patent Literature

Patent Literature 1: Japanese Patent Application Publication No. 2001-105087
Patent Literature 2: Japanese Patent Application Publication No. 02-255240
Patent Literature 3: Japanese Patent Application Publication No. 62-244545
Patent Literature 4: Japanese Patent Application Publication No. 59-45051

SUMMARY OF INVENTION

Technical Problem

In the production of a forged crankshaft, as described above, it is required to reduce formation of flash, thereby improving material yield. Moreover, it is desired that a preform with a precise shape is formed in the preforming process. In the preforming method according to Patent Literature 1, it is possible to perform, to some extent, distribution of the volume of the billet and offset.

However, according to the preforming method of Patent Literature 1 the distribution of volume between a region to be a weight, and a region to be an arm, which integrally includes the weight, is not studied, in a region to be a web. For that reason, in the following die forging process, fillability of material becomes insufficient in the weight that largely projects from the center plane of the arm, and under-filling is likely to occur. To prevent under-filling of the weight, it is convenient to increase excess volume in the preform. However, in such a case, material yield will decline. Hereinafter, a region to be a weight is referred to as a "weight-corresponding part". A region to be an arm, which integrally includes a weight but the weight is excluded, is referred to as an "arm-corresponding part". The weight-corresponding part and the arm-corresponding part are also collectively referred to as a "web-corresponding part".

In the preforming method of Patent Literature 2, it is not possible to perform volume distribution between a weight-corresponding part and an arm-corresponding part in a web-corresponding part. This is also because the method relies on roll forming. Therefore, fillability of the material of the weight becomes insufficient in the following die forging process. As a result, under-filling is likely to occur.

In the preforming method of Patent Literature 3, a facility for performing cross rolling is requited. Therefore, the facility cost increases, and improvement of manufacturing, efficiency is difficult.

In the production method of Patent Literature 4, since preforming and die forging are performed by a single facility, it is not possible to perform preforming in which a billet is significantly deformed. For that reason, with the production method of Patent Literature 4, it is difficult to improve material yield.

It is an objective of the present invention to provide a method for producing a forged crankshaft, which enables formation of a forged crankshaft with a precise shape, and improvement of material yield.

Solution To Problem

The production method of a forged crankshaft of the present embodiment is a production method of a forged, crankshaft including: a plurality of journals each defining a rotation center; a plurality of pins each decentered with respect to the journals; and a plurality of crank arms that connect the journals with the pins, respectively.

The method for producing a forged crankshaft of the present embodiment includes a first preforming process for obtaining a first preform from a billet, a second preforming process for obtaining a final preform from the first preform, and a finish forging process for forming the final preform into a finishing dimension of the forged crankshaft by at least a single die forging step.

In the first preforming process, a region to be the pin and a region to be the journal of the billet are pressed in a direction perpendicular to an axial direction of the billet, thereby reducing a cross sectional area of each of the regions to form a plurality of flat parts.

The second preforming process includes: a process of pressing regions to be the plurality of journals in a pressing direction corresponding to a width direction of the flat part, by using a pair of first dies; and a process of, after starting pressing by the first dies, decentering regions to be the plurality of pins in a decentering direction corresponding to the width direction of the flat part, by using second dies.

In the final preform, a thickness of each region to be the plurality of crank arms is equal to a thickness of the finishing dimension.

Advantageous Effects of Invention

The method for producing a forged crankshaft according to an embodiment of the present invention makes it possible to obtain a final preform, in which distribution of volume in an axial direction is enhanced, by a first preforming process and a second preforming process. Moreover, in the final preform, the volumes of a region to be a journal, a region to be a pin, and a region to be an arm are appropriately distributed. It is possible to form the shape of the forged crankshaft from the final preform by the finish forging process. This allows improvement of material yield. Moreover, according to the present invention, a preform with a precise shape can be formed by the first preforming process and the second preforming process. For that reason, a forged crankshaft with a precise shape can be formed.

DESCRIPTION OF EMBODIMENTS

Figure 1A:
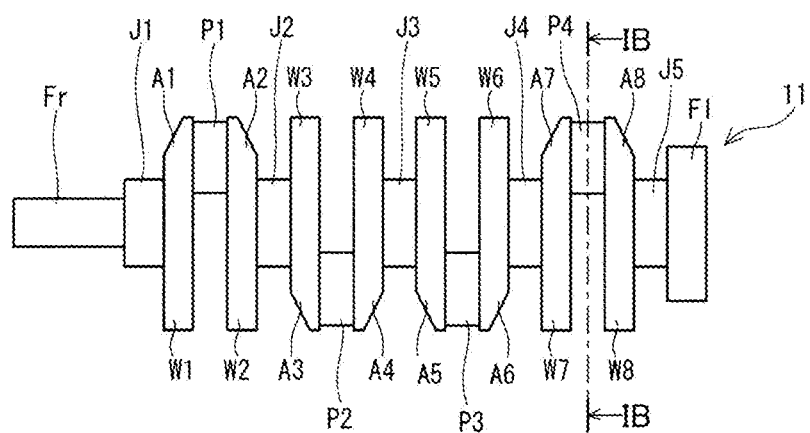
FIG. 1A is a schematic diagram to show an exemplary general shape of a typical forged crankshaft.

The production method of a forged crankshaft of the present embodiment is a production method of a forged crankshaft including: a plurality of journals each defining a rotation center; a plurality of pins each decentered with respect to the journals; a plurality of crank arms that connect the journals with the pins, respectively.

The production method of a forged crankshaft of the present embodiment includes a first preforming process for obtaining a first preform from a billet; a second preforming process for obtaining a final preform from the first preform; and a finish forging process for forming the final preform into a finishing dimension of the forged crankshaft by at least a single die forging step.

In the first preforming process, a region to be the pin and a region to be the journal of the billet are pressed from a direction perpendicular to an axial direction of the billet, so that while a cross sectional area of each of the regions is decreased thereby forming a plurality of flat parts.

The second preforming process includes: a process of pressing regions to be the plurality of journals in a pressing direction corresponding to a width direction of the flat part, by using a pair of first dies; and a process of, after starting pressing by the first dies, decentering regions to be the plurality of pins in a decentering direction corresponding to the width direction of the flat part, by using second dies.

In the final preform, a thickness of each region to be the plurality of crank arms is equal to a thickness of the finishing dimension.

According to the production method of the present embodiment, it is possible to obtain the final preform in which distribution of volume in the axial direction is facilitated by the first preforming process and the second preforming process. Moreover, since, the volumes of the region to be the journal, the region to be the pin, and the region to be the arm are appropriately distributed, the final preform has a shape close to the shape of the forged crankshaft. Thus, by the finish forging process, it is possible to form the shape of the forged crankshaft from the final preform: These allow to improve material yield.

Moreover, in the second preforming process, the second dies, which are operated independently of the first dies that press the regions to be the journals, decenter the regions to be the pins. If the first die is integral with the second die, a portion that decenters a region to be a pin will project further than a portion that presses a region to be a journal. For that reason, when forming is started, only regions to be pins will be decentered and tile first preform is likely to be curved. However, if the second dies are separately operated from the first dies, it is possible to arrange such that the second dies that decenter the regions to be the pins do not project further than a portion that presses a region to be a journal. For that reason, even when forming is started, it is possible to arrange such that first a region to be a journal is pressed, and a region to be a pin is decentered after the region to be the journal is pressed. Therefore, the first preform is not likely to be curved while the regions to be the pins are decentered. Since a first preform in which volume is distributed is pressed at a predetermined position of the first dies, under-filling or the like is not likely to occur in the final preform after pressing.

Preferably, in the second preforming process, after pressing by a pair of first dies is completed, decentering of the regions to be the plurality of pins by the second dies is started.

Preferably, the decentering amount of a region to be a pin is equal to or less than a decentering amount of the finishing dimension.

Hereinafter, the method for producing a forged crankshaft according to the present embodiment will be described with reference to the drawings.

1. Exemplary Production Process

Figure 1B:
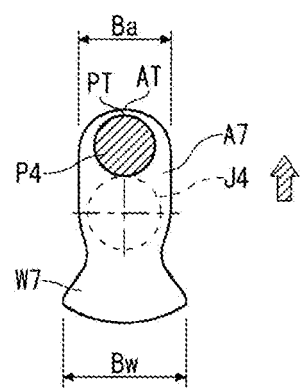
FIG. 1B is an IB-IB sectional view of FIG. 1A.
Figure 2A:
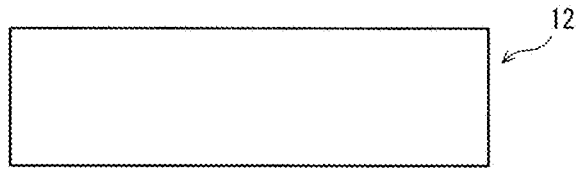
FIG. 2A is a schematic diagram to show a billet in a conventional production process.
Figure 2B:
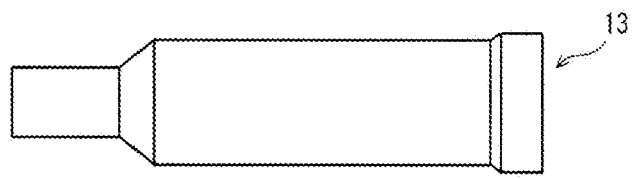
FIG. 2B is a schematic diagram to show a rolled preform in the conventional production process.
Figure 2C:
FIG. 2C is a schematic diagram to show a bent preform in the conventional production process.
Figure 2D:
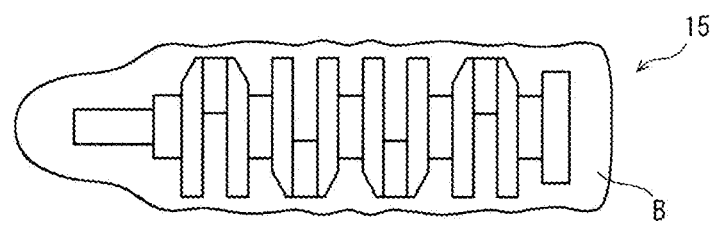
FIG. 2D is a schematic diagram to show a rough forged preform in the conventional production process.
Figure 2E:
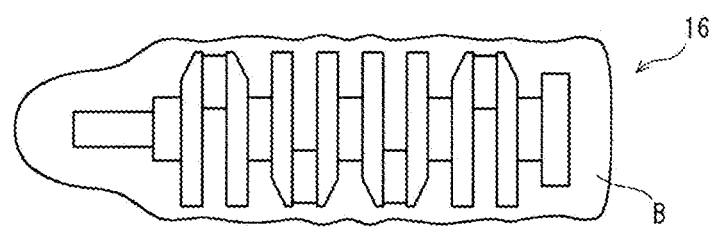
FIG. 2E is a schematic diagram to show a finish forged preform in the conventional production process.
Figure 2F:
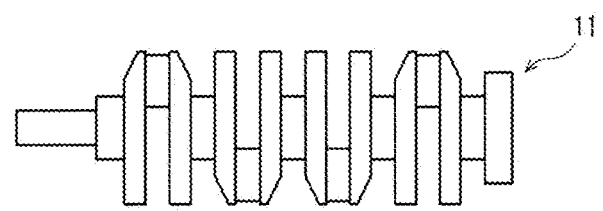
FIG. 2F is a schematic diagram to show a forged crankshaft in the conventional production process.

A forged crankshaft to be addressed by the production method of the present embodiment includes a plurality of journals J that define a rotation center, a plurality of pins P that are decentered with respect to the journals J, and a plurality of arms A that each connect the journals J with the pins P, respectively. For example, a forged crankshaft of 4-cylinder 8-counterweight as shown in FIGS. 1A and 1B is the target of production. In the case of the forged crankshaft of 4-cylinder 8-counterweight, all of the plurality of arms A integrally include a weight W. The aforementioned forged crankshaft of 4-cylinder 4-counterweight or the like is also the target of production. In the case of the forged crankshaft of 4-cylinder 4-counterweight, some of the plurality of arms A integrally include a weight W. Moreover, not all the arms A need to include a weight W. An arm without any weight has an elongated-circular shape. Note that the expression, an arm "integrally" includes a weight, means that the arm and the weight are not separate parts, but both are formed from the same billet.

The production method according to the present embodiment includes a first preforming process, a second preforming process, and a finish forging process. A flash-trimming process may be added as a post process of the finish forging process. Moreover, as required, a coining process may be added after the flash-trimming process. When the adjustment of the layout angle of the pins is required, a twisting process may be added after the flash trimming process. A series of these processes are performed as a hot processing.

Figure 3A:
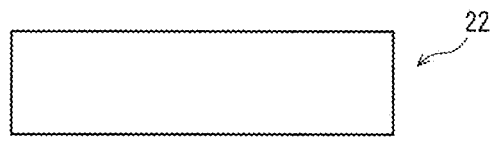
FIG. 3A is a schematic diagram to show a billet in an exemplary production process of the present embodiment.
Figure 3B:
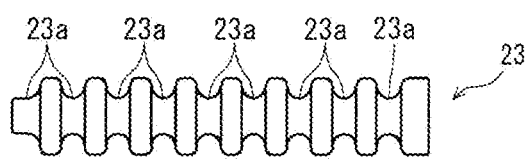
FIG. 3B is a schematic diagram to show a first preform in the exemplary production process of the present embodiment.
Figure 3C:
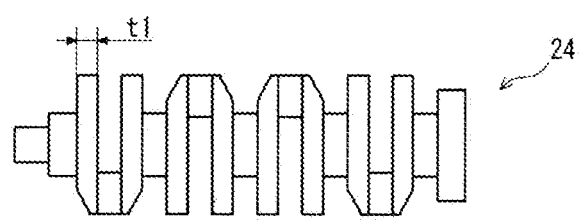
FIG. 3C is a schematic diagram to show a final preform in the exemplary production process of the present embodiment.
Figure 3D:
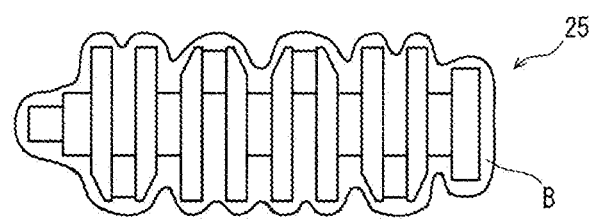
FIG. 3D is a schematic diagram to show finish forged preform in the exemplary production process of the present embodiment.
Figure 3E:
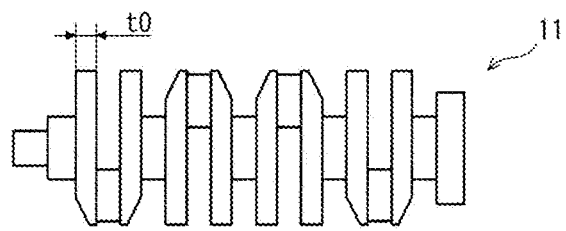
FIG. 3E is a schematic diagram to show a forged crankshaft in the exemplary production process of the present embodiment.

FIGS. 3A to 3E are schematic diagrams to illustrate an exemplary producing process of the forged crankshaft according to the present embodiment. Among these figures, FIG. 3A shows a billet; FIG. 3B a first preform; FIG. 3C a final preform; FIG. 3D a finished forged preform; and FIG. 3E a forged crankshaft. Note that FIGS. 3A to 3E show a series of processes when producing a forged crankshaft 11 having a shape shown in FIG. 1A.

In the first preferring process, cross sectional area is reduced respectively in a plurality of regions to be pins (hereinafter, also referred to as "pin-corresponding parts") and a plurality of regions to be journals (hereinafter also referred to as "journal-corresponding parts") of a billet 22 which is a workpiece. As a result of this, a plurality of flat parts 23a are formed in the billet. The flat parts 23a are formed at, positions of the pin-corresponding parts and the journal-corresponding parts. In the flat part 23a, as shown in FIGS. 5B and 6B to be described below, a width Bf in a direction perpendicular to the pressing direction is larger than a thickness to in the pressing direction. In this way, a first preform 23 in which volume is distributed is obtained. For the first preforming process, for example, a reducer roll or a cross roll may be used. Further, the first preforming process may be performed according to the below described exemplary processing flow by use of the third dies.

The second preforming process includes a pressing process and a decentering process. In the pressing process, the journal-corresponding parts of the first preform 23 are pressed by using a pair of first dies. In the decentering process, after the pressing by the first dies is started, the pin-corresponding parts are decentered by using the second dies. In the second preforming process, the pressing direction and the decentering direction are a width direction of the flat part 23a. That is, in the second preforming process, the first preform 23 obtained in the first preforming process is rotated by 90°, thereafter being pressed. As a result of this, it is possible to obtain a final preform 24 in which an approximate shape of the forged crankshaft has been formed. In the final preform 24, a thickness t1 (see FIG. 3C) in an axial direction of an arm-corresponding part is equal to a thickness t0 of finishing dimension (see FIG. 3E). The thickness t0 of finishing dimension means a thickness in the axial direction of the arm of the forged crankshaft (final product). Moreover, the decentering amount of the pin-corresponding part of the final preform 24 is equal to or less than the decentering amount of the finishing dimension. The decentering amount of the finishing dimension means the decentering amount of the pin of the forged crankshaft. The second preforming process will be described below in detail.

In the finish forging process, as in a conventional finish forging process as described above, the final preform 24 is formed into the finishing dimension of the forged crankshaft by die forging. In specific, a pair of upper and lower dies is used. The final preform 24 is disposed on the lower die in a posture in which the pin-corresponding parts are aligned with each other in a horizontal plane. Then forging is performed by moving the upper die downward. As a result, as excess material flows out, flash B is formed and a finish forged preform 25 with flash is obtained (see FIG. 3D). In the finish forged preform 25, a shape in accordance with the forged crankshaft as the final product is formed. Since an approximate shape of the forged crankshaft is formed in the final preform 24, it is possible to limit the formation of flash B to a minimum when subjecting the final preform 24 to forging in the finish forging process. The finish forging process may be performed in one step, or in several separate steps.

In the flash-trimming process, for example, with the finish forged preform 25 with flash being sandwiched between a pair of dies, the flash B is punched off by use of a tool die. Thus, the flash B is removed from the finish forged preform 25. As a result, the forged crankshaft 11 (final product) is obtained.

2. Exemplary Processing Flow of First Preforming Process

Figure 4A:
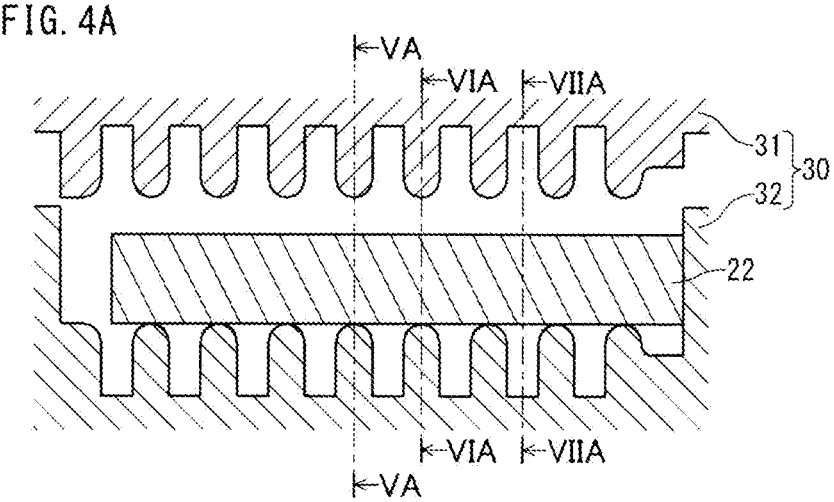
FIG. 4A is a longitudinal sectional view to schematically show a state before pressing in the exemplary processing flow of the first preforming process.
Figure 4B:
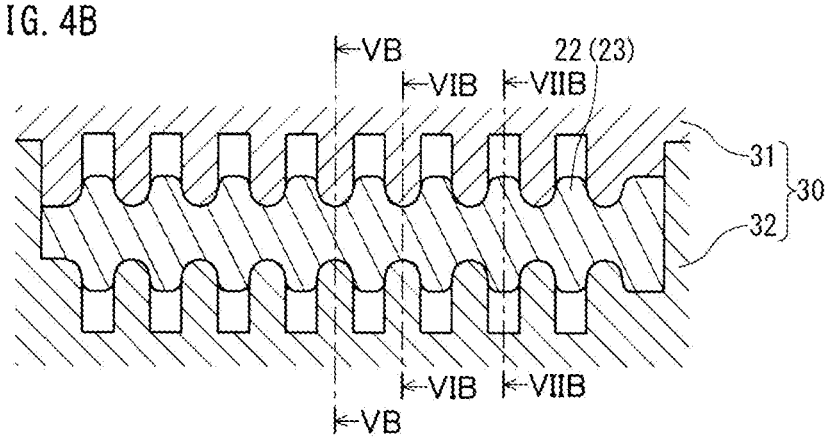
FIG. 4B is a longitudinal sectional view to schematically show a state when pressing is ended in the exemplary processing flow of the first preforming process.

FIGS. 4A to 7B are schematic diagrams to show an exemplary processing flow of the first preforming process. Among these figures, FIG. 4A is a longitudinal sectional view to show a state before pressing, and FIG. 4B is a longitudinal sectional view to show a state when pressing is ended.

Figure 5A:
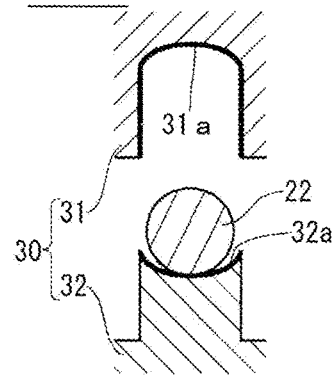
FIG. 5A is a cross sectional view to show a region to be a journal before pressing in the exemplary processing flow of the first preforming process.
Figure 5B:
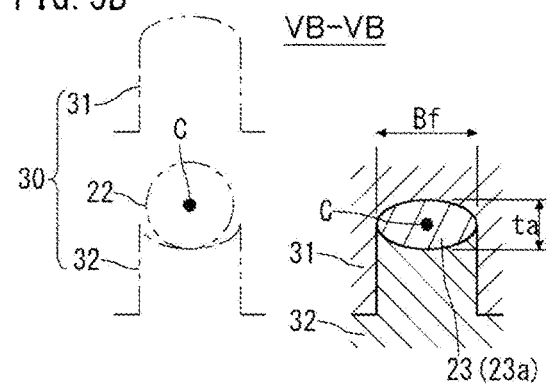
FIG. 5B is a cross sectional view to show the region to be the journal when pressing is ended in the exemplary processing flow of the first preforming process.

FIGS. 5A and 5B are cross sectional views to show journal-corresponding parts. Among these figures, FIG. 5A shows a state before pressing and FIG. 5B shows a state when pressing is ended. Further, FIG. 6A is a VA-VA sectional view of FIG. 4A, and FIG. 5B is a VB-VB sectional view of FIG. 4B.

Figure 6A:
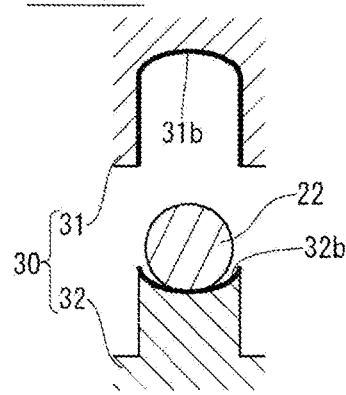
FIG. 6A is a cross sectional view to show a region to be a pin before pressing in the exemplary processing flow of the first preforming process.
Figure 6B:
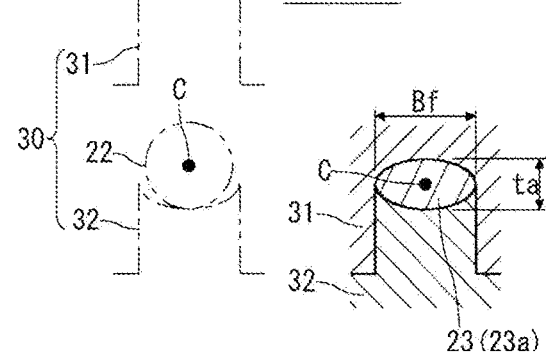
FIG. 6B is a cross sectional view to show the region to be the pin when pressing is ended in the exemplary processing flow of the first preforming process.

FIGS. 6A and 6B are cross sectional views to show pin-corresponding parts. Among these figures, FIG. 6A shows a state before pressing and FIG. 6B shows a state when pressing is ended. Further. FIG. 6A is a VIA-VIA sectional view of FIG. 4A, and FIG. 6B is a VIB-VIB sectional view of FIG. 4B.

Figure 7A:
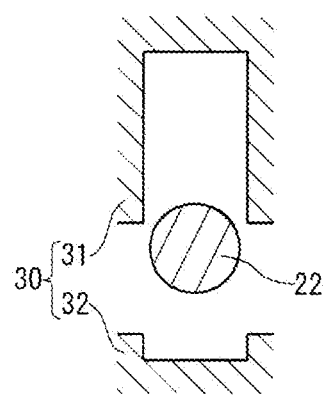
FIG. 7A is a cross sectional view to show an arm-corresponding part before pressing in the exemplary processing flow of the first preforming process.
Figure 7B:
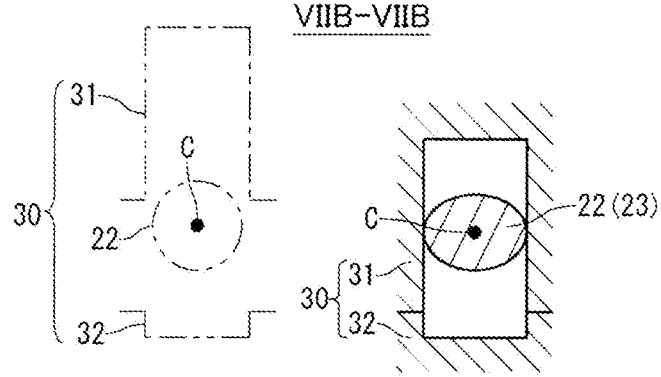
FIG. 7B is a cross sectional view to show the arm-corresponding part when pressing is ended in the exemplary processing flow of the first preforming process.

FIGS. 7A and 7B are cross sectional views to show arm-corresponding parts. Among these figures, FIG. 7A shows a state before pressing and FIG. 7B shows a state when pressing is ended. Further, FIG. 7A is a VIIA-VIIA sectional view of FIG. 4A, and FIG. 7B is a VIIB-VIIB sectional view of FIG. 4B.

FIGS. 4A to 7B show the billet 22 having a circular cross section, and third dies 30 consisting of a pair of upper and lower dies. The third dies 30 include a third upper die 31 and a third lower die 32. For easy understanding of the state, in FIGS. 5B, 6B, and 7B, the third upper die 31, the third lower die 32, and the billet 22 before pressing are indicated together by two-dot chain lines and an axial position C of the journal-corresponding part is indicated by a black circle. The pair of third dies 30 includes a pin-processing part that is to abut against a pin-corresponding part, and a journal-processing part that is to abut against a journal-corresponding part.

The journal-processing part consists of, as shown by thick lines in FIG. 5A, an upper-die journal-processing part 31a and a lower-die journal-processing part 32a. The upper-die journal-processing part 31a is provided in the third upper die 31. The lower-die journal-processing part 32a is provided in the third lower die 32. The upper-die journal-processing part 31a has a concave shape and can accommodate the billet. The lower-die journal-processing part 32a is provided in a front end surface of a convex part. It is noted that there is no limitation on which of the upper-die journal-processing part 31a and the lower-die journal-processing part 32a is formed into a concave shape. That is, the lower-die journal-processing part 32a may have a concave shape that can accommodate the billet.

The pin-processing part consists of, as indicated by thick lines in FIG. 6A, an upper-die pin-processing part 31b and a lower-die pin-processing part 32b. The upper-die pin-processing part 31b is provided in the third upper die 31. The lower-die pin-processing part 32b is provided in the third lower die 32. The upper-die pin-processing part 31b has a concave shape and can accommodate the billet. The lower-die pin-processing part 32b is provided in a front end surface of a convex part. It is noted that: there is no limitation on which of the upper-die pin-processing part 31b and the lower-die pin-processing part 32b is formed into a concave shape. That is, the lower-die pin-processing part 32b may have a concave shape that can accommodate the billet.

In the first preforming process, the billet 22 is disposed between the third upper die 31 and the third lower die 32 in a state in which the third upper die 31 is moved upward such that the third upper die 31 and the third lower die 32 are separated, as shown in FIG. 4A. When the third upper die 31 is moved downward from this state, the pin-corresponding part of the billet 22 is accommodated in the concave upper-die pin-processing part 31b (see FIG. 6A), and the journal-corresponding part is accommodated in the concave upper-die journal-processing part 31a (see FIG. 5A). When the third upper die 31 is further moved downward, the billet is pressed by the upper-die pin-processing part 31b and the lower-die pin-processing part 32b, and by the upper-die journal-processing part 31a and the lower-die journal-processing part 32a, and cross sectional areas of pressed regions decrease. As a result, flat parts 23a as shown in FIGS. 5B and 6B are formed. In a cross section of the flat part 23a, a width Bf is larger than a thickness to (see FIGS. 5B and 6B). The dimensions of the width Bf and the thickness ta of the flat part 23a may differ in the journal-corresponding part and the pin-corresponding part. After pressing by the third dies 30 is ended, the third upper die 31 is moved upward, and the processed billet 22 (first preform 23) is taken out.

With such exemplary processing flow being adopted, as the pin-corresponding parts and the journal-corresponding parts are pressed, the material is moved in the axial direction of the billet. Because of this, the material flows into the arm-corresponding part between the pin-corresponding part and the journal-corresponding part. As a result, it is possible to obtain the first preform whose volume is distributed in the axial direction.

Moreover, according to the exemplary processing flow shown in FIGS. 4A to 7B, in the course of moving the third upper die 31 downward, the opening of the concave upper-die pin-processing part 31b is blocked by the lower-die pin-processing part 32b so that a closed section is formed by the upper-die pin-processing part 31b and the lower-die pin-processing part 32b. Further, the opening of the concave upper-die journal-processing part 31a is blocked by the lower-die journal-processing part 32a so that a closed section is formed by the upper-die journal-processing part 31a and the lower-die journal-processing part 32a. As a result, no flash will be formed between the third upper die 31 and the third lower die 32. Therefore, it is possible to improve material yield and enhance axial distribution of volume.

When a pair of third dies are used in the first preforming process, it is not necessary, in view of facilitating distribution of volume in the axial direction, to press the arm-corresponding part with the third dies (see FIGS. 7A and 7B).

Moreover, to regulate the shape (dimension) of the arm-corresponding part, the arm-corresponding part may be partially pressed by the third dies.

3. First Dies and Second Dies to be used in Second Preforming Process

In the second preforming process of the present embodiment, pressing of the journal-corresponding parts and decentering of the pin-corresponding parts are performed. The pressing of the journal-corresponding parts and the decentering of the pin-corresponding parts are performed by separate pairs of dies.

If the pressing of the journal-corresponding parts and the decentering of the pin-corresponding parts are performed by a single pair of dies, the following problems may arise.

Figure 8:
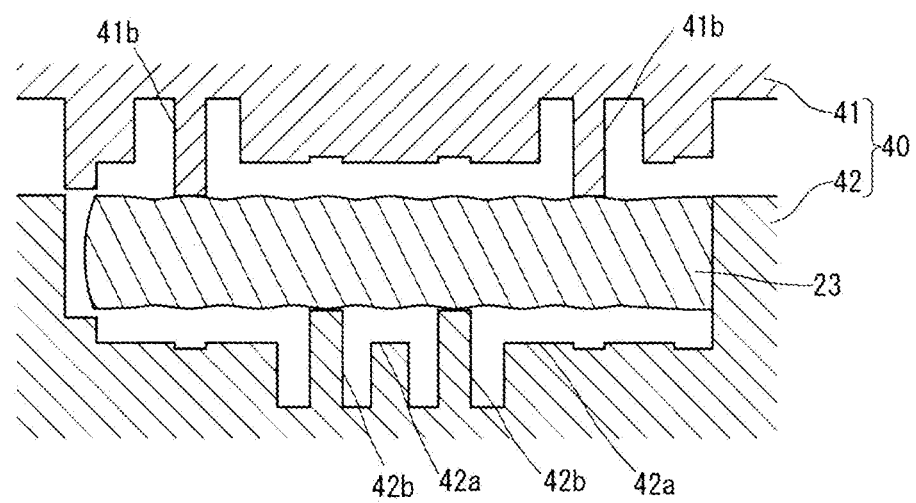
FIG. 8 is a longitudinal sectional view to show a case where a second preforming process is performed by a single die.

FIG. 8 is a longitudinal sectional view to show a case where the second preforming process is performed by a single die. Referring to FIG. 8, the first preform 23 is disposed on a first lower die 42 with a first upper die 41 and the first lower die 42 being separated. As described above, in the second preforming process, the pin-corresponding parts are decentered. The lower-die pin-processing part 42b of the first lower die 42, which processes the pin-corresponding part of the first preform 23, projects further than the lower-die journal-processing part 42a. Therefore, if the first preform 23 is disposed in the first lower die 42, the first preform 23 will be supported at two points by two of the lower-die pin-processing parts 42b. Moreover, the upper-die pin-processing part 41b of the first upper die 41 is disposed closer to the end part of the first preform 23 than the lower-die pin-processing part 42b. If first dies 40 press the first preform 23 in this state, a load is applied to the first preform 23 with the lower-die pin-processing part 42b as a fulcrum and with the upper-die pin-processing part 41b as a point of effort. As a result of this, a bending moment acts on the first preform 23. When the bending moment acting on the first preform 23 is excessively large, the first preform 23 will be curved. If the first upper die 41 reaches a bottom dead center with the first preform 23 being curved, the position of the first preform 23 to be pressed by the first dies 40 will be deviated from a predetermined position. That is, a situation in which the pin-processing part of the first dies 40 presses the arm-corresponding part of the first preform 23 may occur. For that reason, under-filling or the like may occur in the final preform after pressing. To prevent this, two dies are used in the second preforming process of the present embodiment.

Figure 9:
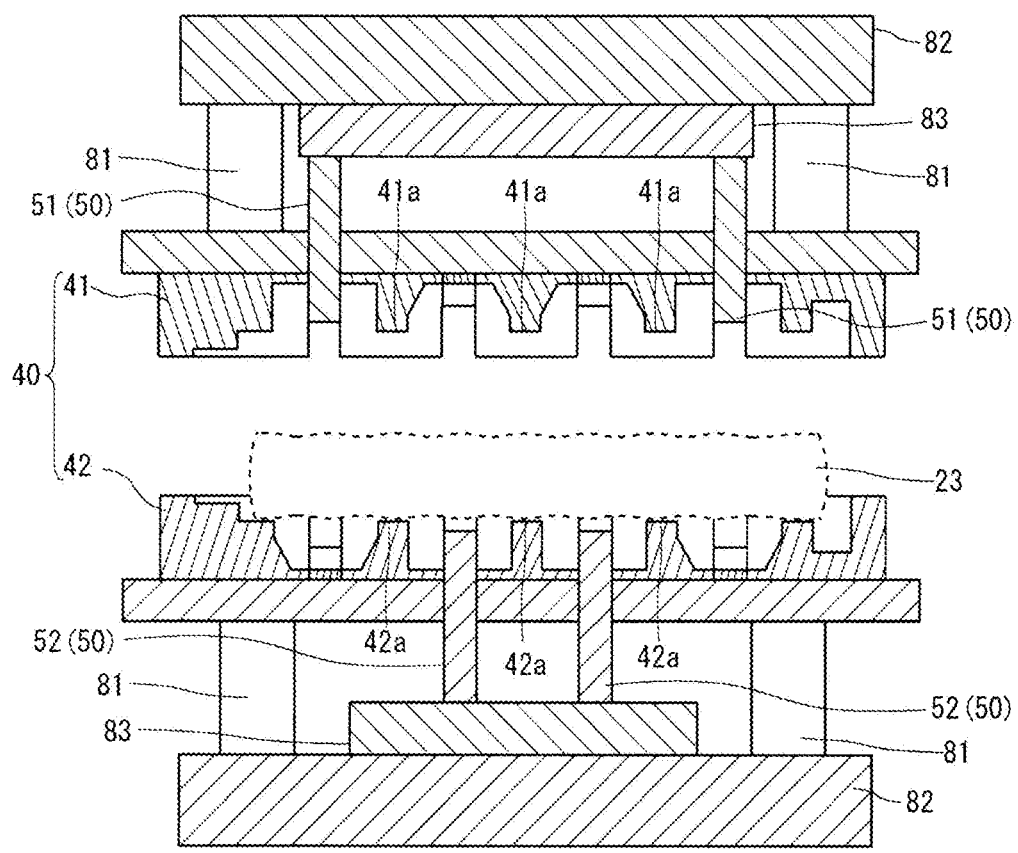
FIG. 9 is a longitudinal sectional view to show first dies and second dies of the present embodiment.

FIG. 9 is a longitudinal sectional view to show the first dies and the second dies of the present embodiment. Referring to FIG. 9, the production apparatus of the present embodiment includes the first dies 40 and second dies 50. The second dies 50 include a second upper die 51 and a second lower die 52. In the case of a forged crankshaft of 4-cylinder engine, the second dies 50 include two second upper dies 51 and two second lower dies 52. The second upper die 51 and the second lower die 52 can move upward and downward independently of the first dies 40. Before pressing the first preform 23, the second lower die 52 is disposed at the same height of, or below, the lower-die journal-processing part 42a, and the second upper die 51 is disposed at the same height of, or above, an upper-die journal-processing part 41a. That is, the second lower die 52 and the second upper die 51 do not project further than the lower-die journal-processing, part 42a and the upper-die journal-processing part 41a. Therefore, even if the first preform 23 is disposed in the first lower die 42 before pressing is started, the first preform 23 will not be supported by the second lower die 52. The first preform 23 is supported by a plurality of lower-die journal-processing parts 42a. The area in which the plurality of lower-die journal-processing parts 42a support the first preform 23 is larger than the area in which the second lower die 52 supports the first preform. The same applies to the first upper die 41 and the second upper die 51. If the first die 40 presses the first preform 23 in this state, the journal-corresponding parts are uniformly pressed. That is, the pin-corresponding part of the first preform 23 is not likely to be subjected to load. For that reason, a bending moment is not likely to act on the first preform 23.

Further, after pressing of the first preform 23 by the lower-die journal-processing part 42a of the first dies 40 is started, decentering of pin-corresponding parts of the first preform 23 by the second lower die 52 of the second dies 50 is started. After pressing of the first preform 23 by the upper-die journal-processing part 41a of the first dies 40 is started, decentering of pin-corresponding parts of the first preform 23 by the second upper die 51 of the second dies 50 is started. Therefore, during decentering of the pin-corresponding parts, the journal-corresponding parts of the first preform 23 are being pressed by the upper-die journal-processing part 41a and the lower-die journal-processing part 42a. That is, the journal-corresponding part of the first preform 23 is restricted by the upper-die journal-processing part 41a and the lower-die journal-processing part 42a. Therefore, the first preform 23 is less likely to move during decentering of the pin-corresponding part, and will be pressed at a predetermined position.

Briefly, as a result of that the second upper die 51 and the second lower die 52 move upward and downward independently of each other, and that the journal-corresponding parts of the first preform 23 are pressed preceding to the pin-corresponding parts, the first preform 23 is less likely to be curved during decentering of the pin-corresponding parts. Since the first preform 23 in which volume is distributed is pressed at a predetermined position of the first dies 40, under-filling or the like is less likely to occur in the final preform after pressing.

The configurations of the first dies 40 and the second dies 50 will be described. The second dies 50 include a control mechanism for causing the second upper die 51 and the second lower die 52 to move upward and downward independently of each other. The control mechanism is, for example, a die cushion and a hydraulic cylinder.

Referring, to FIG. 9, a case in which the control mechanism is a die cushion 81 will be described. The first lower die 42 is supported by a bolster base 82 via the die cushion 81. The die cushion 81 has a cushioning function. The second lower die 52 is supported by the bolster base 82 via a pin base 83. When the first lower die 42 starts pressing the first preform 23, the second lower die 52 starts projecting from the first lower die 42 due to the cushioning function of the die cushion 81. The die cushion 81 is set such that after the upper-die journal-processing part 41a and the lower-die journal-processing part 42a come into abutment with the journal-corresponding part of the first preform 23, the second lower die 52 comes into abutment against the pin-corresponding part of the first preform 23. The same applies to the first upper die 41 and the second upper die 51. As a result of this, the pin-corresponding part of the first preform 23 is decentered after pressing of the journal-corresponding part is started.

Figure 10:
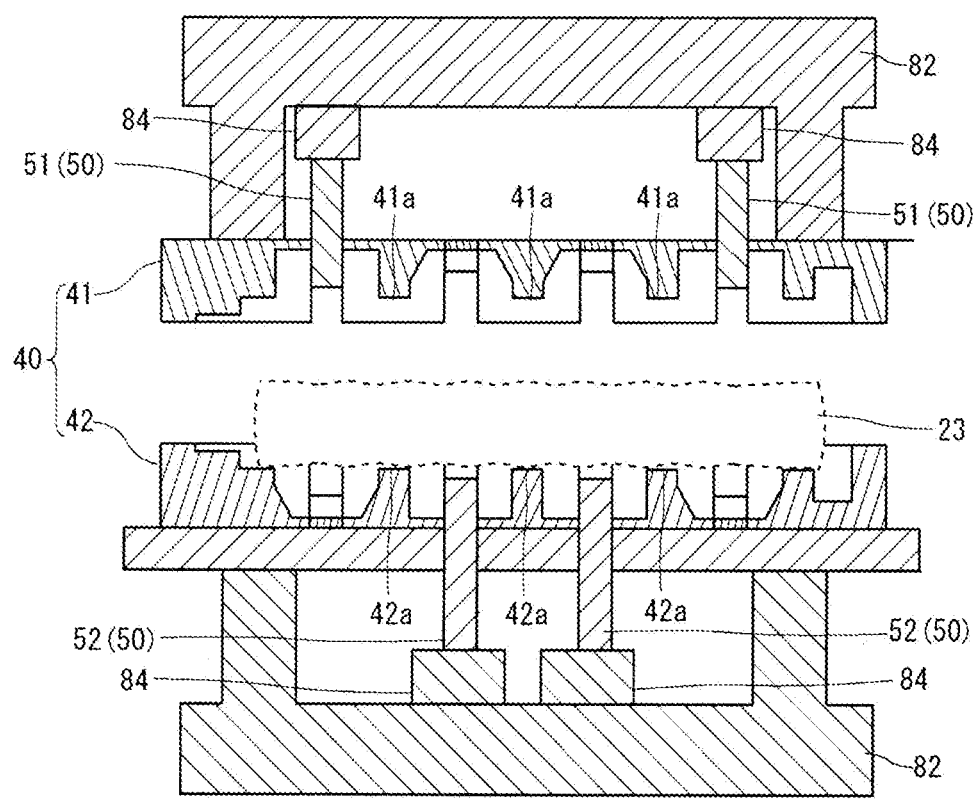
FIG. 10 is a longitudinal sectional view to show the first dies and the second dies of the present embodiment, which are different from FIG. 9.

FIG. 10 is a longitudinal sectional view to show the first dies and the second dies of the present embodiment, which are different from FIG. 9. Referring to FIG. 10, description will be made on a case in which the control mechanism is a hydraulic cylinder 84. The hydraulic cylinder 84 can move the second lower die 52 upward and downward. The second lower die 52 is supported by the bolster base 82 via the hydraulic cylinder 84. When the first lower die 42 starts pressing the first preform 23, the hydraulic cylinder 84 operates and the second lower die 52 starts projecting from the first lower die 42. The hydraulic cylinder 84 is set such that after the upper-die journal-processing part 41a and the lower-die journal-processing, part 42a come into abutment with the journal-corresponding part of the first preform 23, the second lower die 52 comes into abutment against the pin-corresponding part of the first preform 23. The same applies to the first upper die 41 and the second upper die 51. As a result of this, the pin-corresponding part of the first preform 23 is decentered after pressing of the journal-corresponding part is started.

In either case in which the control mechanism is a die cushion or a hydraulic cylinder, the timing that the second lower die 52 projects from the first lower die 42 is appropriately set. The same applies to the first upper die 41 and the second upper die 51. That is, the pin-corresponding part may be decentered during a period from start to completion of pressing of the journal-corresponding part. The pin-corresponding parts may be decentered after completion of pressing of the journal-corresponding parts.

Performing decentering of pin-corresponding parts not in the first preforming process but in the second preforming process has the following advantages. In the first preforming process, the cross sectional areas of the pin-corresponding parts of the billet decrease. That is, the cross sectional area of a pin-corresponding part of the first preform 23 is smaller than the cross sectional area of a pin-corresponding part of the billet. For that reason, decentering the pin-corresponding parts of the first preform 23 will result in smaller cross sectional areas of the pin-corresponding parts after decentering than decentering the pin-corresponding parts of the billet, thus leaving less excess material. A smaller amount of excessive material will result in smaller amount of flash after finish forging process that follows, thus improving material yield. Therefore, in the production method of the present embodiment, decentering of the pin-corresponding parts is performed in the second preforming process to improve material yield.

4. Exemplary Processing Flow of Second Preforming Process

Figure 11A:
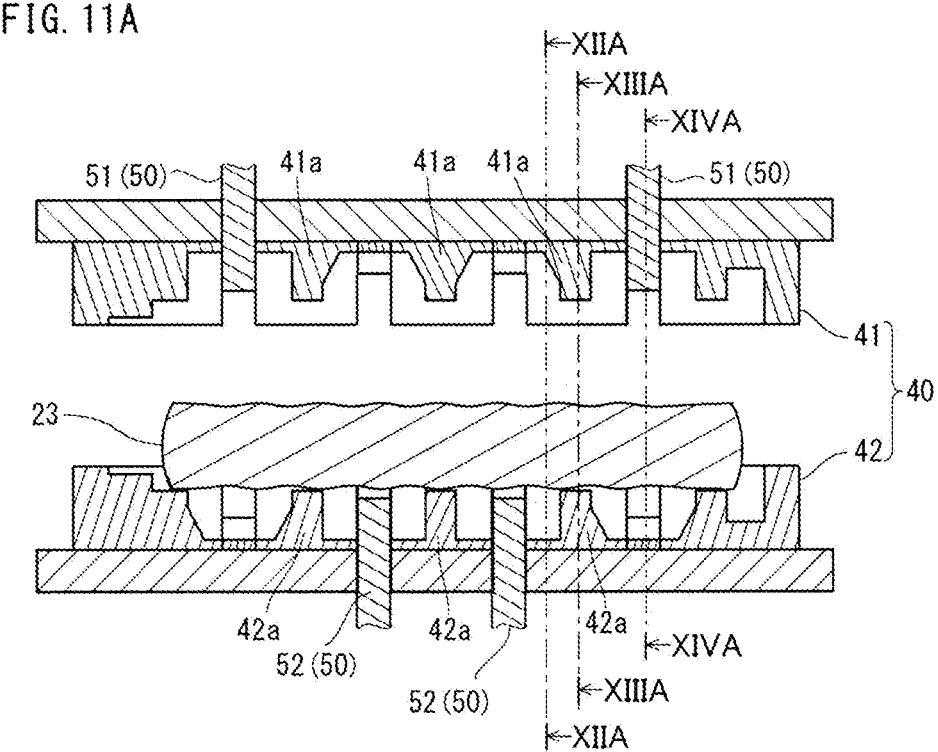
FIG. 11A is a longitudinal sectional view to show a state when pressing process is started in an exemplary processing flow of the second preforming process.
Figure 11B:
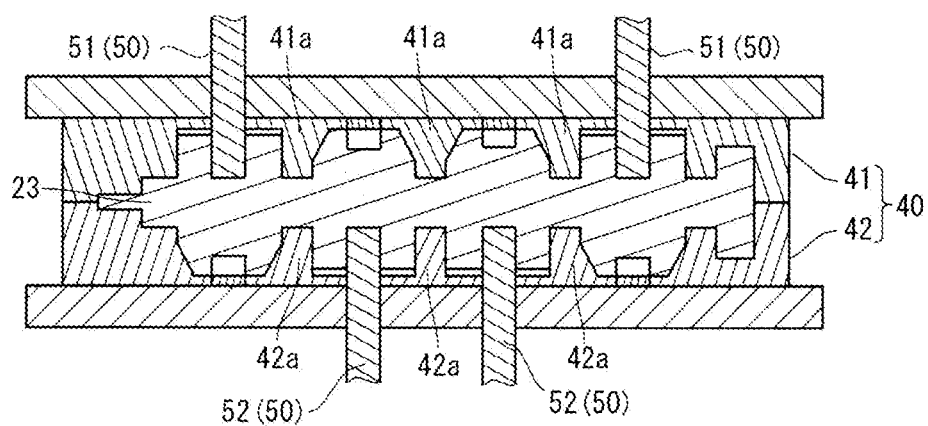
FIG. 11B is a longitudinal sectional view to show a state when pressing process is ended in the exemplary processing flow of the second preforming process.
Figure 11C:
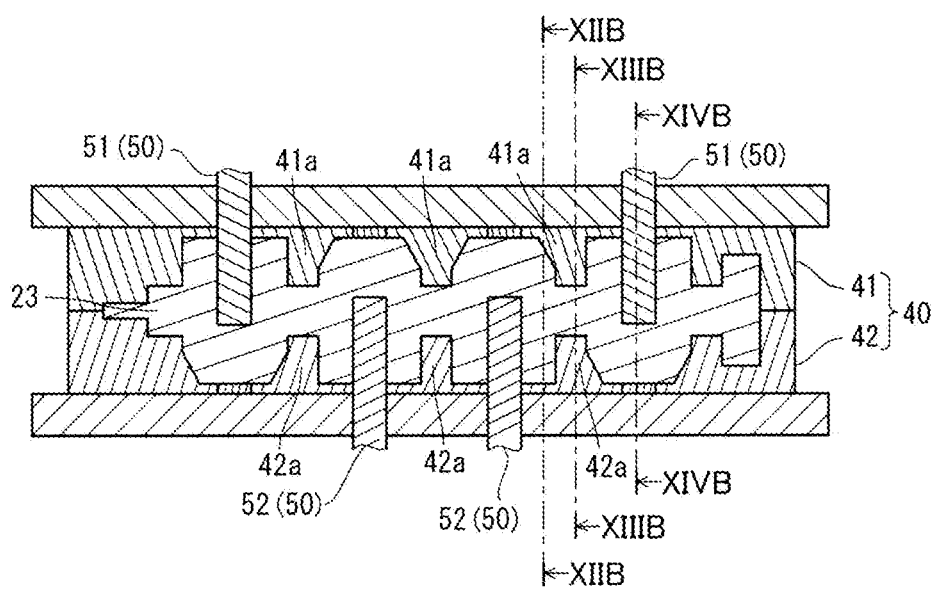
FIG. 11C is a longitudinal sectional view to show a state when decentering process is ended in the exemplary processing flow of the second preforming process.

FIGS. 11A to 14B are schematic diagrams to show an exemplary processing flow of the second preforming process. Among these figures, FIG. 11A is a longitudinal sectional view to show a state when pressing process is started; FIG. 11B is a longitudinal sectional view to show a state when pressing process is ended; and FIG. 11C is a longitudinal sectional view to show a state when decentering process is ended.

Figure 12A:
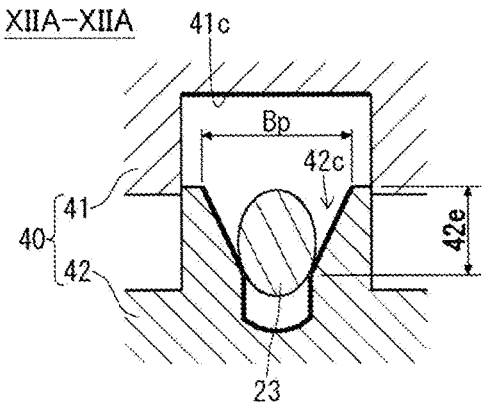
FIG. 12A is a cross sectional view to show a region to be an arm when pressing process is started in the exemplary processing flow of the second preforming process.
Figure 12B:
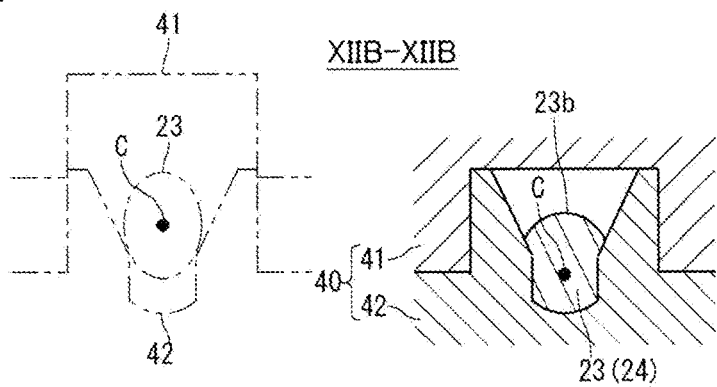
FIG. 12B is a cross sectional view to show the region to be the arm when pressing process is ended in the exemplary processing flow of the second preforming process.

FIGS. 12A and 12B are cross sectional views to show the arm-corresponding part. Among these figures, FIG. 12A shows a state when pressing process is started, and FIG. 12B shows a state when pressing process is ended. Note that FIG. 12A is an XIIA-XIIA sectional view of FIG. 11A, and FIG. 12B is an XIIB-XIIB sectional view of FIG. 11C.

Figure 13A:
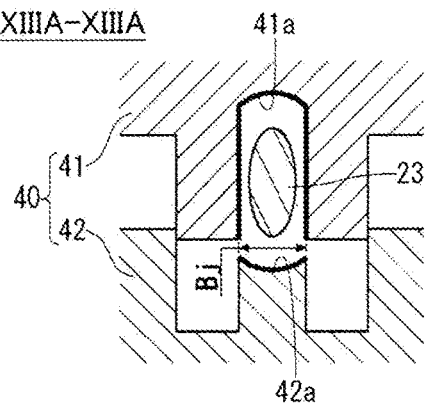
FIG. 13A is a cross sectional view to show a region to be a journal when pressing process is started in the exemplary processing flow of the second preforming process.
Figure 13B:
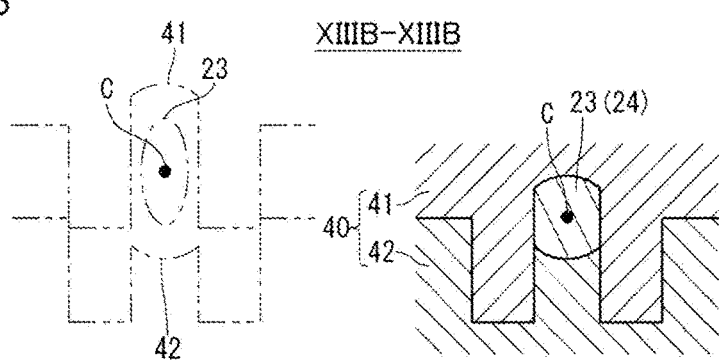
FIG. 13B is a cross sectional view to show the region to be the journal when pressing process is ended in the exemplary processing flow of the second preforming process.

FIGS. 13A and 13B are cross sectional views to show the journal-corresponding part. Among these figures, FIG. 13A shows a state when pressing process is started; and FIG. 13B shows a state when pressing process is ended. Note that FIG. 13A is an XIIIA-XIIIA sectional view of FIG. 11A, and FIG. 13B is an XIIIA-XIIIB sectional view of FIG. 11C.

Figure 14A:
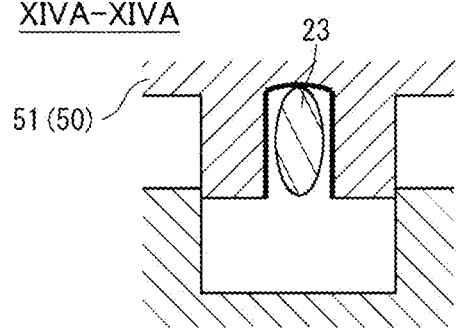
FIG. 14A is a cross sectional view to show a region to be a pin when the decentering process is started in the exemplary processing flow of the second preforming process.
Figure 14B:
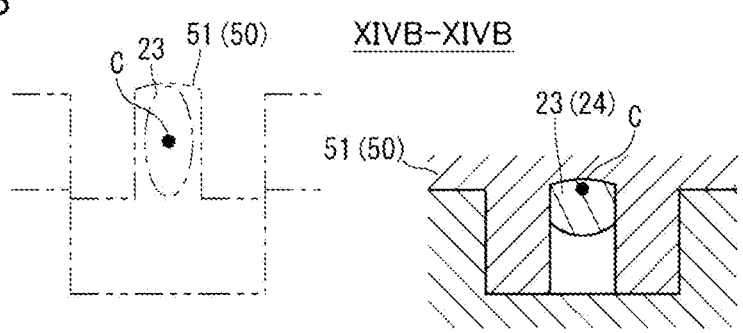
FIG. 14B is a cross sectional view to show the region to be the pin when the decentering process is ended in the exemplary processing flow of the second preforming process.

FIGS. 14A and 14B are cross sectional views to show the pin-corresponding part. Among these figures, FIG. 14A shows a state when decentering process is started; and FIG. 14B shows a state when decentering process is ended. Note that FIG. 14A is an XIVA-XIVA sectional view of FIG. 11A, and FIG. 14B is an XIVB-XIVB sectional view of FIG. 11C.

FIGS. 11A to 13B show the first preform 23 obtained in the above described first preforming process and the upper and lower pair of first dies 40. FIGS. 14A and 14B show the first preform 23 and second dies 50. The first dies 40 include a first upper die 41 and a first lower die 42. For easy understanding of the state, in FIGS. 12B and 13B, the first upper die 41, the first lower die 42, and the first preform 23 when pressing is started are indicated together by two-dot chain lines, and an axial position C of the journal-corresponding part is indicated by a black circle. In FIG. 14B, the second upper die 51 and the first preform 23 when pressing is started are indicated together by two-dot chain lines, and an axial position C of the journal-corresponding part is indicated by a black circle. The pair of first dies 40 includes an upper-die arm-processing part 41c and a lower-die arm-processing part 42c, which are to abut against arm-corresponding parts of the first preform 23, and an upper-die journal-processing part 41a and a lower-die journal-processing part 42a, which are to abut against journal-corresponding parts. The second dies 50 include second upper dies 51 and second lower dies 52. One second upper die 51 abuts against a region to be a first pin (first pin-corresponding part), and another second upper die 51 abuts against a region to be a fourth pin (fourth pin-corresponding part). One the second lower die 52 abuts against a region to be a second pin (second pin-corresponding part), and another second lower die 52 abuts against a region to be a third pin (third pin-corresponding part).

The cross sectional shape of the arm-processing part is, as shown by a thick line in FIG. 12A, the lower-die arm-processing part 42c has a concave shape. The other upper-die arm-processing part 41c has a plane shape. It is noted that which of the upper-die arm-processing part or the lower-die arm-processing part is formed into a concave shape can be appropriately set according to the shape of the forged crankshaft.

When the arm of the forged crankshaft includes the weight, the lower-die arm-processing part 42c has a weight-processing part 42e which is to abut against a region to be the weight (weight-corresponding part). The weight-processing part 42e is located on the opening side of the concave lower-die arm-processing part 42c. An opening width Bp of the weight-processing part 42e is widened as moving away from the bottom surface of the concave lower-die arm-processing part 42c. For example, as shown in FIG. 12A, both of the side surfaces of the weight-processing part 42e are inclined surfaces.

In the second preforming process, as described above, the thickness of the arm-corresponding part is made to be equal to the thickness of the finishing dimension. As a result, the lengths in the axial direction of the upper-die arm-processing part 41c and the lower-die arm-processing part 42c are equal to the thickness of the finishing dimension of the arm.

The journal-processing part consists of, as shown by a thick line in FIG. 13A, the upper-die journal-processing part 41a and the lower-die journal-processing part 42a. The upper-die journal-processing part 41a is provided in the first upper die 41, The lower-die journal-processing part 42a is provided in the first lower die 42. The upper-die journal-processing part 41a has a concave shape and can accommodate the whole of flat parts of the first preform 23. The lower-die journal-processing part 42a is provided in a front end surface of a convex part. It is noted that there is no limitation on which of the upper-die journal-processing part 41a and the lower-die journal-processing part 42a is formed into a concave shape. That is, the lower-die journal-processing part may have a concave shape which can accommodate the whole of the flat parts of the first preform.

The second upper die Si of the second dies 50 has a concave shape as indicated by a thick line in HG. 14A and can accommodate the whole of the flat parts of the first preform 23. The second lower die has a configuration in which the second upper die 51 is inverted upside down.

In the second preforming process, the first preform 23 is disposed between the first upper die 41 and the first lower die 42 in a state in which the first upper die 41 is moved upward such that the first upper die 41 and the first lower die 42 are separated, as shown in FIG. 11A. In such occasion, the first preform 23 is disposed in a posture in which it is rotated around its axis by 90° from a state when the first preforming process is ended such that the width direction (longitudinal diameter direction in the case of an ellipse) of the flat part corresponds to the pressing direction and the decentering direction.

From this state, the first upper die 41 of the first dies 40 is moved downward. Then, as shown in FIGS. 13A and 14A, the flat part of the first preform 23 is accommodated in the concave upper-die journal-processing part 41a and the second upper die 51. In such occasion, as shown in FIG. 12A, a major part of the arm-corresponding part is disposed in the weight-processing part 42e of the lower-die arm-processing part 42c in such a way that the arm-corresponding part will not come into contact with a bottom surface of the lower-die arm-processing part 42c.

When the first upper die 41 is further moved downward, a closed section is formed by the upper-die journal-processing part 41a and the lower-die journal-processing part 42a. When, in this state, the first upper die 41 is further moved downward to reach a bottom dead center, the whole of the flat parts within the upper-die journal-processing part 41a and the lower-die journal-processing part 42a is pressed. In this way, the flat parts of the first preform 23 are pressed by the first dies 40 and, as a result, the cross sectional area of the journal-corresponding part will decrease. Accordingly, excess material flows in the axial direction entering into the arm-corresponding parts so that the distribution of volume progresses.

After pressing by the first dies 40 is started, preferably after pressing is ended, the second upper die 51 and the second lower die 52 of the second dies 50 decenter the pin-corresponding parts. The center of gravity of the pin-corresponding part moves in the decentering direction of the pin (see a hatched arrow in FIG. 1B). Then the decentering amount of the pin-corresponding part becomes equal to the decentering amount of the finishing dimension. However, the decentering amount of the pin-corresponding part will not be limited to this. The deeentering amount of the pin-corresponding part may be smaller than the decentering amount of the finishing dimension. In such a case, in the finish forging process, the decentering amount of the pin-corresponding part is adjusted to be the decentering amount of the finishing dimension.

After pressing by the first dies 40 is ended, the first upper die 41 and the second upper die 51 are moved upward, and the processed first preform 23 (final preform 24) is taken out. In the final preform 24 thus obtained, the thickness of the arm-corresponding part is equal to the thickness of the finishing dimension.

According to the second preforming process, material flows from the pin-corresponding part and the journal-corresponding part to the arm-corresponding part. As a result, it is possible to distribute volume in the axial direction. Further, the material flows within the arm-processing parts 41c, 42c, and the arm-corresponding part becomes narrower on the bottom surface side of the concave shape, and wider on the opening side of the concave shape. As a result, volume is appropriately distributed in the arm-corresponding part. As a result, in the following finish forging process, it is possible to suppress occurrence of under-filling in the arm. Moreover, excess material to be provided in the arm-corresponding part can be reduced, thus improving material yield. Moreover, when the arm includes the weight, it is possible to restrict the occurrence of under-filling in the weight. Further, as a result of that the second upper die 51 and, the second lower die 52 of the second dies 50 move upward and downward independently of each other, and that the journal-corresponding part of the first preform 23 is pressed preceding to the pin-corresponding part, the first preform 23 is less likely to be curved during decentering of the pin-corresponding part. Since, as a result of this, the first preform 23 in which volume is distributed is pressed at a predetermined position of the first dies 40, under-filling or the like is less likely to occur in the final preform after pressing, and a final preform having an accurate shape can be obtained.

According to the production method of the present embodiment, a final preform can be obtained by the above described first preforming process and the second preforming process. For that reason, it is possible to improve material yield.

Further, according of the production method of the present embodiment, it is possible to facilitate the distribution of volume in the axial direction by the first preforming process and the second preforming process. That is, it is possible to reduce the cross sectional areas of the pin-corresponding part and the journal-corresponding part, and increase the cross sectional area of the arm-corresponding part. Since a final preform in which an approximate shape of the forged crankshaft is formed is used, it is possible to limit the formation of flash to a minimum even in the finish forging process. As a result, it is possible to improve material yield.

5. Volume Distribution within Arm-Corresponding Part

Volume distribution in the arm-corresponding part by the second preforming process can be adjusted by appropriately changing the shape of the arm-processing parts 41c, 42c depending on the shape of the forged crankshaft (final product). For example, the opening width of the arm-processing part may be changed, or an inclined surface may be provided in the arm-processing part.

6. Preferable Aspects, etc.

As described above, in the second preforming process, a region of the upper side of the upper-die journal-processing part 41a acts as a partition to limit the flow of material in the axial direction when forming the arm-corresponding part. To enhance this action, it is important to have a narrow opening width (Bj: see FIG. 13A) in the concave upper-die journal-processing part 41a. On the other hand, when the opening width Bj of the concave upper-die journal-processing part is excessively small, load in the following process will increase.

For this reason, the opening width Bj (mm) of the concave upper-die journal-processing part is preferably 0.5 to 1.5 in a ratio with respect to a diameter Dj (mm) of the journal of the forged crankshaft (final product).

In the above described first preforming process, the entire circumference of a billet is pressed by using the third dies 30. Upon performing such pressing, the upper-die journal-processing part 31a and the lower-die journal-processing part 32a are kept to form a closed section, and the upper-die pin-processing part 31b and the lower-die pin-processing part 32b are also kept to form a closed section. This will make it possible to prevent formation of flash. The formation of flash may also be prevented by partially pressing the journal-corresponding part with the journal-processing part. Moreover, the formation of flash may be prevented by partially pressing the pin-corresponding part with the pin-processing part.

Moreover, it goes without saying that the present embodiment will not be limited to the above described embodiment, and can be modified in various ways within a range not departing from the spirit of the present invention. For example, even when a forged crankshaft having an elongated-circular shaped arm and not having any weight (for example, a forged crankshaft of 4-cylinder 4-counter weight) is produced, the first preforming, process, the second preforming process, and the finish forging process of the above described embodiments can be applied thereto.

INDUSTRIAL APPLICABILITY

The present invention can be effectively used for producing a forged crankshaft to be mounted on a reciprocating engine.

REFERENCE SIGNS LIST

11: Forged crankshaft
22: Billet
23: First preform
23a: Flat part
24: Final preform
25: Finish forged preform
30: Third die
31: Third upper die
31a: Upper-die journal-processing part of third dies
31b: Upper-die pin-processing part of third dies
32: Third lower die
32a: Lower-die journal-processing part of third dies
32b: Lower-die pin-processing part of third dies
40: First die
41: First upper die
41a: Upper-die journal-processing part of first die
41b: Upper-die pin-processing part of first die
41c: Upper-die arm-processing part of first dies
42: First lower die
42a: Lower-die journal-processing part of first die
42b: Lower-die pin-processing part of first die
42c: Lower-die arm-processing part of first die
42e: Weight-processing part
50: Second die
51: Second upper die
52: Second lower die
A, A1 to A8: Crank arm
J, J1 to J5: Journal
P, P1 to P4: Pin
W, W1 to W8: Counterweight
B: Flash

The invention claimed is:

1. A production method of a forged crankshaft which includes: a plurality of journals each defining a rotation center; a plurality of pins each decentered with respect to the journals; and a plurality of crank arms that connect the journals with the pins, respectively, the production method comprising:

a first preforming process for obtaining a first preform from a billet;

a second preforming process for obtaining a final preform from the first preform; and a finish forging process for forming the final preform into a finish forged preform with finishing dimensions of the forged crankshaft by at least a single die forging step, wherein in the first preforming process, a region to be the pins and a region to be the journals of the billet are pressed in a direction perpendicular to an axial direction of the billet, thereby reducing a cross sectional area of each of the regions to form a plurality of flat parts, the second preforming process includes: a process of pressing regions to be the plurality of journals in a pressing direction corresponding to a width direction of the flat part, by using a pair of first dies; and a process of, after pressing by the first dies has started, while regions to be the plurality of journals are restricted by the first dies, decentering regions to be the plurality of pins in a decentering direction corresponding to the width direction of the flat part, by using second dies, in the final preform, a thickness of each region to be the plurality of crank arms is equal to a thickness of the crank arms of the forged crankshaft, the first dies include journal-processing parts which are to abut against regions to the plurality of journals, and wherein the second dies to not project further than the journal-processing parts before pressing by the first dies has started.

2. The production method of a forged crankshaft according to claim 1, wherein in the second preforming process, after pressing by the pair of first dies is completed, decentering of each region to be the plurality of pins by the second dies is started.

3. The production method of a forged crankshaft according to claim 1, wherein
    a decentering amount of each region to be the pins is equal to or less than a decentering amount of the pins of the forged crankshaft.

4. The production method of a forged crankshaft according to claim 2, wherein
    a decentering amount of each region to be the pins is equal to or less than a decentering amount of the pins of the forged crankshaft.

\* \* \* \* \*